(No Model.)
T. P. WILLIAMS.
FRUIT PICKER.
No. 546,950. Patented Sept. 24, 1895.
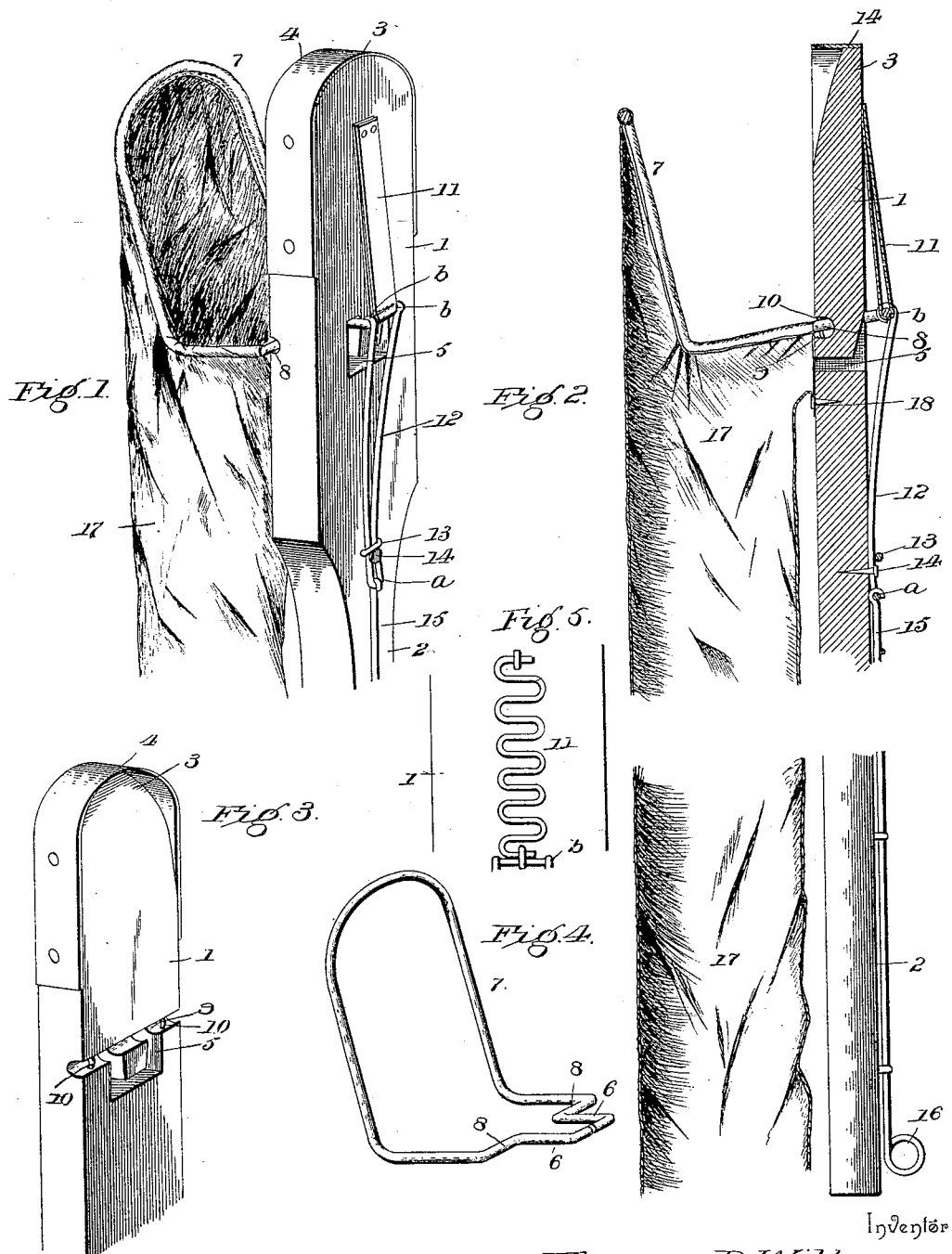
Witnesses
F. M. Johnson
E. B. Owens
Inventor
Thomas P. Williams
By his Attorneys.
C. A. Snow & Co.

UNITED STATES PATENT OFFICE.

THOMAS PAGE WILLIAMS, OF TROUP, TEXAS, ASSIGNOR OF ONE-HALF TO S. A. NORMAN, OF SAME PLACE.

FRUIT-PICKER.

SPECIFICATION forming part of Letters Patent No. 546,950, dated September 24, 1895.

Application filed December 15, 1894. Serial No. 531,958. (No model.)

*To all whom it may concern:*

Be it known that I, THOMAS PAGE WILLIAMS, a citizen of the United States, residing at Troup, in the county of Smith and State of Texas, have invented a new and useful Fruit-Picker, of which the following is a specification.

This invention relates to an improvement in fruit-pickers of that class which are provided with a jaw or jaws and with mechanism for operating them so that the stem of the fruit may be severed. This class of fruit-pickers is also provided with a tube or chute constructed of a suitable fabric and designed to convey the fruit to the hands of the operator, or into a basket or other receptacle provided therefor.

The object of my invention is to provide means for more effectually and easily severing the stem of the fruit and for conveying the so-severed fruit into the receptacle provided for it, and in a manner which will be attended by less jar or bruising than ordinarily.

To this end the invention consists in a rigid jaw-section having certain peculiar features of construction and provided with a rounded front end which carries a stem-cutting blade. Connected to the rigid jaw and co-operating with the cutting-blade thereof is a movable jaw, which has, as hereinafter described, peculiar features of construction, and which operates with the structure of the rigid jaw so as to be capable of moving into engagement with the knife of the latter in the operation of severing the stem of the fruit. These peculiar features of construction with which the several elements of my invention are endowed will be fully described hereinafter, and the novel portion embodied in the claim.

In the drawings, Figure 1 represents a perspective view of a fruit-picker constructed after the manner of my invention, and the parts being shown in operative relation; Fig. 2, a longitudinal section, the section being extended through the jaws and including the remaining portion of the device. Fig. 3 is a perspective view taken from the under side of the rigid jaw and shown with the fruit-conveying tube detached, so that the construction of the parts may be more readily illustrated. Fig. 4 is a perspective view of a movable jaw, showing the construction thereof and shown with the chute or tube detached. Fig. 5 is a view of a modification.

The reference-numeral 1 indicates the rigid jaw of the picker, and this is preferably constructed of wood, though it may be formed of any other suitable material. The rear extremity of the jaw has rigidly secured to it or formed integral therewith, and preferably the latter, the handle 2, which extends for any suitable distance, the object being to permit the operator to stand on the ground and to reach the fruit which may be on the tree. This will necessitate making the handle 2 long enough to extend from the ground up to the limbs of the tree. It is not shown to be such a length in the drawings, but this will be understood.

The front end of the jaw 1 is rounded and reduced to form a nose 3, around which the cutting-blade 4 is secured. The blade 4 is of a width equal to the maximum thickness of the rigid jaw, and owing to the reduction in the thickness of the same at the nose 3, the blade 4 will project over or below the lower side of the rigid jaw, so as to be capable of cutting the stem of the fruit, as will be be better explained hereinafter.

Formed about midway in the jaw 1 and extending through the same is the opening 5, which is substantially U-shaped in form and arranged with its extremities toward the front of the jaw. Within this opening 5 the upper ends 6 of the wire composing the movable jaw 7 are arranged, and these upper ends extend first vertically and then horizontally and inwardly toward each other, so that a substantially U-shaped device will be described, and which is capable of swinging through the opening 5 in the operation of the device. Below the ends 6 the wire composing the movable jaw extends outwardly and horizontally, so as to form journals 8. These journals 8 are mounted in the transverse slots 9, formed in the under side of the rigid jaw 1, they being held therein by means of staples 10, which form bearings and which in practice may be given any suitable embodiment. The other ends of the journals 8 are extended downwardly and thence forwardly to form the jaw proper 7. The jaw proper 7 is oval-shaped at its front end and is arranged in such a manner and formed in such a size that it will be capable of passing over the lower edge of the blade 4, so as to press the stem of the fruit into engagement therewith and effect the severing thereof.

11 indicates an elastic band which extends longitudinally with the jaw 1, and from a point near the front end thereof rearwardly to the opening 5. The front end of the elastic band 11 is rigidly secured to the jaw 1 by means of screws or tacks or any suitable fastening device, and is formed with a loop at its rear end, which embraces the terminals of the ends 6 of the wire composing the movable jaw, and, owing to its retractile elasticity, gives said ends a tendency to a vertical or perpendicular position, the movements in such direction being limited by the engagement of the vertical portion of the ends 6 with the front ends of the opening 5. This tendency of the ends 6 to assume a perpendicular position results in a consequent tendency of the jaw proper 7 to swing rearwardly or to an open position, which will be slightly more than parallel with the jaw 1, so as to form a flaring opening and so as to facilitate the easier introduction of the fruit into a chute or tube, as will hereinafter appear.

12 indicates a rod or wire which is bent at its middle to form an eye $a$. The extremities of this rod or wire are formed with eyes $b$, which respectively embrace the ends 6 of the wire composing the movable jaw 7, so as to be pivotally connected thereto.

13 indicates a staple which is driven into a rear portion of the jaw 1 and which embraces the rod or wire 12 at its rear end. Co-operating with the staple 13 is the pin 14, which is located directly rearward of the staple 13, and which is arranged between the parallel portion of the wire or rod 12. By these means the wire or rod is steadied in its movements and made capable of easier reciprocation, but prevented from lateral play. Pivotally connected to the eye $a$ of the wire or rod 12 is the operating-wire 15, which is also formed with an eye receiving the eye $a$ and whereby the two are pivotally connected. The wire 15 extends parallel with the handle 2 to the lower end thereof, where it is formed with a loop 16 to permit grasping of the same, which will be necessary in the operation of the device. The wire 15 may be held on the handle 2 by means of securing-staples similar to the staple 13, or by any other suitable keepers.

17 indicates the fruit-conveying tube or chute, which may be formed of any strong fabric, such as canvas or other cloth, and which has its upper end formed with a casing receiving the jaw proper 7. A small portion of the chute or tube 17 is not provided with a casing, and this portion is that which is directly adjacent to the jaw 1, and it is connected to said jaw by means of tacks or screws 18, passing through it into the jaw, as will be readily understood. The tube or chute 17 is of a length equal to the length of the handle 2, and is adapted to extend downwardly, so as to empty into a basket or other receptacle, or so as to deposit fruit upon the ground, or, if desired, into the operator's hands.

In the use of my invention the handle 2 is grasped by the operator, who may stand upon the ground or be located in a secure part of the tree, and the spring or elastic 12 allowed to open the jaw 7, whereupon the device should be advanced upon the fruit and extended so that the fruit will be located in or directly over the upper end of the tube or chute 17. The wire 15 should now be drawn downwardly, which will result in a swinging of the movable jaw 7 and in the consequent passing of the front portion of the said jaw over the edge of the blade 4. This will sever the stem of the fruit and permit the same to fall into the tube or chute 17, down which it will gravitate, as has been explained. The band or spring 11 should now be permitted to open the jaw 7, whereupon the device will be in position for a second operation, which may be continued until the requisite amount of fruit has been picked, all of which will be understood.

Fig. 5 illustrates a modification of the device, wherein the elastic band 11 is substituted by a retractile serpentine spring, which may be formed of steel, as usual, and which is secured in the position occupied by the elastic band, all of which has been described. This arrangement is, perhaps, preferable to the elastic bands 11, since it is more durable and will have more strength. It is, however, a matter which does not relate to the essentialities of my invention, and may therefore be left to the judgment of the manufacturer.

Changes in the form, proportion, and minor details of construction may be resorted to without departing from the principle or sacrificing any of the advantages of this invention.

Having thus described my invention, what I claim is—

In a fruit picker, a rigid jaw formed with a transverse horizontal groove or recess, and a handle formed integrally therewith, in combination with a pivoted jaw made from a single wire blank and comprising a swinging loop or mouth portion, transversely aligning journal portions mounted in the transverse groove or recess in the fixed jaw, and a crank portion in the form of a three sided loop projecting through an aperture in the fixed jaw, substantially as and for the purpose specified.

In testimony that I claim the foregoing as my own I have hereto affixed my signature in the presence of two witnesses.

THOMAS PAGE WILLIAMS.

Witnesses:
J. W. GASTON,
W. I. BRITTAIN.